United States Patent
Suthar et al.

(10) Patent No.: US 10,361,843 B1
(45) Date of Patent: Jul. 23, 2019

(54) NATIVE BLOCKCHAIN PLATFORM FOR IMPROVING WORKLOAD MOBILITY IN TELECOMMUNICATION NETWORKS

(71) Applicant: Cisco Technology, Inc., San Jose, CA (US)

(72) Inventors: Om Prakash Suthar, Bolingbrook, IL (US); Ammar Rayes, San Ramon, CA (US); Michael David Geller, Wetson, FL (US); Ian McDowell Campbell, Littleton, CO (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/205,017

(22) Filed: Nov. 29, 2018

Related U.S. Application Data

(60) Provisional application No. 62/682,778, filed on Jun. 8, 2018.

(51) Int. Cl.
*H04L 9/06* (2006.01)
*H04L 9/08* (2006.01)
(Continued)

(52) U.S. Cl.
CPC ........ *H04L 9/0637* (2013.01); *G06F 9/45558* (2013.01); *H04L 9/083* (2013.01);
(Continued)

(58) Field of Classification Search
CPC ... H04L 63/0823; H04L 9/0637; H04L 9/083; H04L 9/30; H04L 9/321; H04L 47/70; G06F 9/45558; H04W 8/02
See application file for complete search history.

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| CN | 107784748 A | 3/2018 |
| WO | WO 2013/020126 | 2/2013 |

(Continued)

OTHER PUBLICATIONS

Alexandros Kaloxylos, A Survey and an Analysis of Network Slicing in 5G Networks, IEEE (Year: 2018).*

(Continued)

*Primary Examiner* — Shanto Abedin
(74) *Attorney, Agent, or Firm* — Polsinelli PC

(57) ABSTRACT

A network slice manager receives a workload mobility request to add network resources to a domain in the communication network, and authenticates a virtual network function (VNF) with a blockchain authentication function (BAF) over a blockchain network interface based on the workload mobility request. The network slice manager further receives an indication of a successful authentication from the BAF, and instantiates the VNF in the domain of the communication network based on the indication of the successful authentication. Notably, these authentication processes may be readily adapted to instantiate new network resources or migrate existing network resources between domains.

15 Claims, 9 Drawing Sheets

(51) Int. Cl.
*H04L 12/24* (2006.01)
*H04L 29/06* (2006.01)
*G06F 9/455* (2018.01)
*H04L 9/32* (2006.01)
*H04L 9/30* (2006.01)
*H04L 12/911* (2013.01)
*H04W 8/02* (2009.01)

(52) U.S. Cl.
CPC ............... *H04L 9/30* (2013.01); *H04L 9/321* (2013.01); *H04L 47/70* (2013.01); *H04W 8/02* (2013.01); *G06F 2009/4557* (2013.01); *G06F 2009/45595* (2013.01); *H04L 2209/38* (2013.01)

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,856 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara, et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 10,108,954 B2 | 10/2018 | Dunlevy et al. |
| 10,164,779 B2 | 12/2018 | Uhr et al. |
| 10,171,248 B2 | 1/2019 | King |
| 2003/0087645 A1 | 5/2003 | Kim et al. |
| 2003/0116634 A1 | 6/2003 | Tanaka |
| 2004/0029576 A1 | 2/2004 | Flykt et al. |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0146803 A1 | 7/2006 | Bae et al. |
| 2006/0187866 A1 | 8/2006 | Werb et al. |
| 2006/0245406 A1 | 11/2006 | Shim |
| 2007/0037605 A1 | 2/2007 | Logan |
| 2007/0130471 A1 | 6/2007 | Walker Pina et al. |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0284777 A1 | 11/2012 | Eugenio et al. |
| 2012/0311127 A1 | 12/2012 | Kandula, Sr. et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |

(56) References Cited

U.S. PATENT DOCUMENTS

| | | |
|---|---|---|
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1* | 3/2015 | Sif .................... G06F 9/45558 370/254 |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0164212 A1* | 6/2017 | Opsenica ............. H04W 12/06 |
| 2017/0180134 A1 | 6/2017 | King |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0214675 A1 | 7/2017 | Johnsrud et al. |
| 2017/0243208 A1 | 8/2017 | Kurian et al. |
| 2017/0273083 A1 | 9/2017 | Chen et al. |
| 2017/0317997 A1 | 11/2017 | Smith et al. |
| 2017/0330179 A1 | 11/2017 | Song et al. |
| 2017/0330180 A1 | 11/2017 | Song et al. |
| 2017/0332421 A1 | 11/2017 | Sternberg et al. |
| 2017/0339706 A1 | 11/2017 | Andreoli-Fang et al. |
| 2018/0060835 A1 | 3/2018 | Martin |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0084427 A1* | 3/2018 | Huo ................ H04L 63/0815 |
| 2018/0136633 A1 | 5/2018 | Small et al. |
| 2018/0139056 A1 | 5/2018 | Imai et al. |
| 2018/0139107 A1* | 5/2018 | Senarath ............. H04L 41/5003 |
| 2018/0212970 A1* | 7/2018 | Chen .................... H04L 63/062 |
| 2018/0253539 A1 | 9/2018 | Minter et al. |
| 2018/0294966 A1 | 10/2018 | Hyun et al. |
| 2018/0343128 A1 | 11/2018 | Uhr et al. |
| 2018/0374094 A1 | 12/2018 | Kohli |
| 2019/0012695 A1 | 1/2019 | Bishnoi et al. |
| 2019/0058709 A1* | 2/2019 | Kempf ................. H04L 9/3226 |

FOREIGN PATENT DOCUMENTS

| | | |
|---|---|---|
| WO | WO 2014/098556 | 6/2014 |
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Ihsan H. Abdulqadder et al, Deployment of Robust Security Scheme in SDN Based 5G Network Over NFV Enabled Cloud Environment, IEEE (Year: 2018).*

"Cisco ASR 5x00 Mobility Management Entity Administration Guide," Version 15.0, Cisco Systems, Inc., Last updated Jun. 13, 2014, pp. 1-266.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to The University of Liverpool, Sep. 28, 2005, 116 pages.

(56) References Cited

OTHER PUBLICATIONS

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al., "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming-IoT_Whitepaper.pdf, pp. 1-14.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Moinet, Axel, et al. "Blockchain based trust & authentication for decentralized sensor networks," Jun. 6, 2017, 6 pages.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.," A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

Sun, et al., "The future of Wi-Fi," IEEE Communications Magazine, vol. 52, No. 11, Nov. 21, 2014, 166 pages.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Wright, Joshua, "Detecting Wireless LAN MAC Address Spoofing," Jan. 21, 2003, pp. 1-20.

Yang, Hui, et al. "Blockchain-based trusted authentication in cloud radio over fiber network for 5g." Optical Communications and Networks (ICOCN), 2017 16th International Conference on. IEEE, 2017, 3 pages.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

Morozov, Yury, "BubbleTone Blockchain: Global Telecom Ecosystem Without Intermediaries: Smart Contracts Allow Direct Interaction Between Mobile Operators, Subscribers and Service Providers," Dec. 29, 2017, pp. 1-33.

"Blockchain @ Telco: How blockchain can impact the telecommunications industry and its relevance to the C-Suite," Monitor Deloitte, Jun. 20, 2018, pp. 1-13.

\* cited by examiner

US 10,361,843 B1

NATIVE BLOCKCHAIN PLATFORM FOR IMPROVING WORKLOAD MOBILITY IN TELECOMMUNICATION NETWORKS

CROSS-REFERENCE TO RELATED APPLICATIONS

This application claims priority to U.S. Provisional Patent Application No. 62/682,778, filed on Jun. 8, 2018, the content of which is incorporated herein by reference in its entirety.

TECHNICAL FIELD

The present subject matter relates generally to communication networks, and more particularly, to natively integrating blockchain technologies in the context of improving workload mobility (e.g., sharing network resources) for telecommunication networks (e.g., 4G, 5G, etc.)

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which provides a new service-oriented architecture for provisioning network services/resources in a dynamic, scalable, and customizable fashion (e.g., micro-services, Network Functions Virtualization (NFV), etc.) However, while many of these networks provide robust security for air-interface communications (e.g., between User Equipment (UE) and Radio Access Networks (RANs), security within respective core networks varies between mobile service providers based on their own policies, standards, maturity, and so on. In turn, these varying levels of security make inter-operability, roaming, and network resource sharing between these mobile service providers complicated and expensive.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
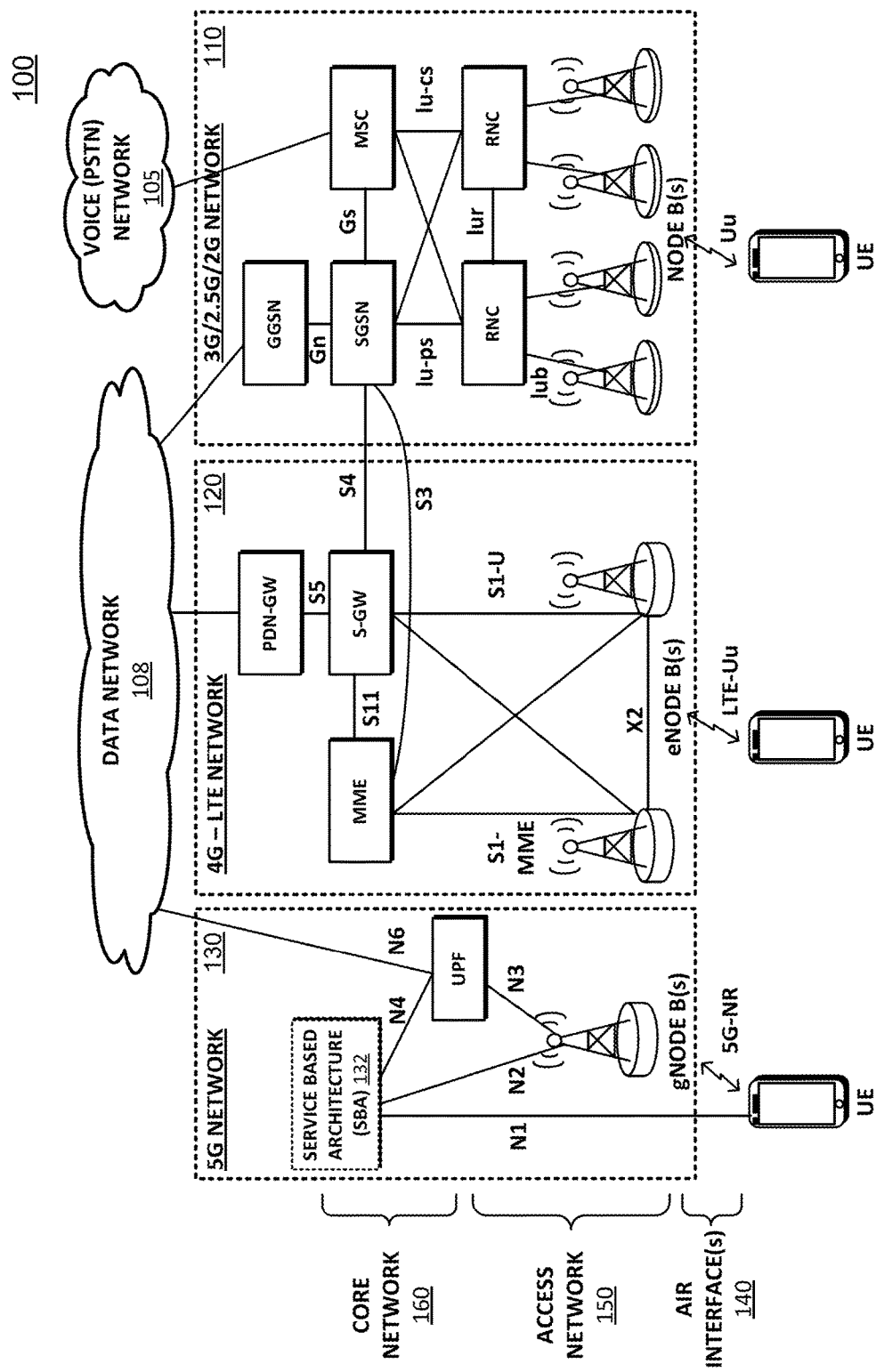
FIG. 1 illustrates a schematic block diagram of exemplary telecommunication networks, including a 3G network, a 4G network, and a 5G network.

This disclosure describes techniques for improving workload mobility and network resource sharing between domains of a telecommunication network (e.g., 4G/5G networks, etc.) using a natively integrated blockchain platform. In particular, these techniques leverage the blockchain platform to build trust by authenticating workloads, Virtual/Network Functions (V/NFs), and network resources associated therewith. For example, according to one or more embodiments of this disclosure, a network slice manager device (or entity) receives a workload mobility request to add network resources to a domain in the communication network, and authenticates a Virtual Network Function (VNF) with a Blockchain Authentication Function (BAF) entity over a blockchain network interface based on the workload mobility request. The network slice manager further receives an indication of a successful authentication from the BAF entity, and instantiates the VNF in the domain of the communication network based on the indication of the successful authentication. Notably, these authentication processes may be readily adapted to instantiate new network resources, or to migrate existing network resources between domains.

Description

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities "Network Function(s)" (NF(s)), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks. Further, it is also appreciated that the NFs described herein may also include (or be represented by) "virtual" NFs (VNF(s)), which refer network functions employed in a virtual environment.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram 100 of exemplary telecommunication networks, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 generally evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

As discussed in greater detail herein, 5G network 130 introduces a new service base architecture (SBA) 132, which generally redistributes functionality of 4G network entities into smaller service-based functions/network entities. Here, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Figure 2:
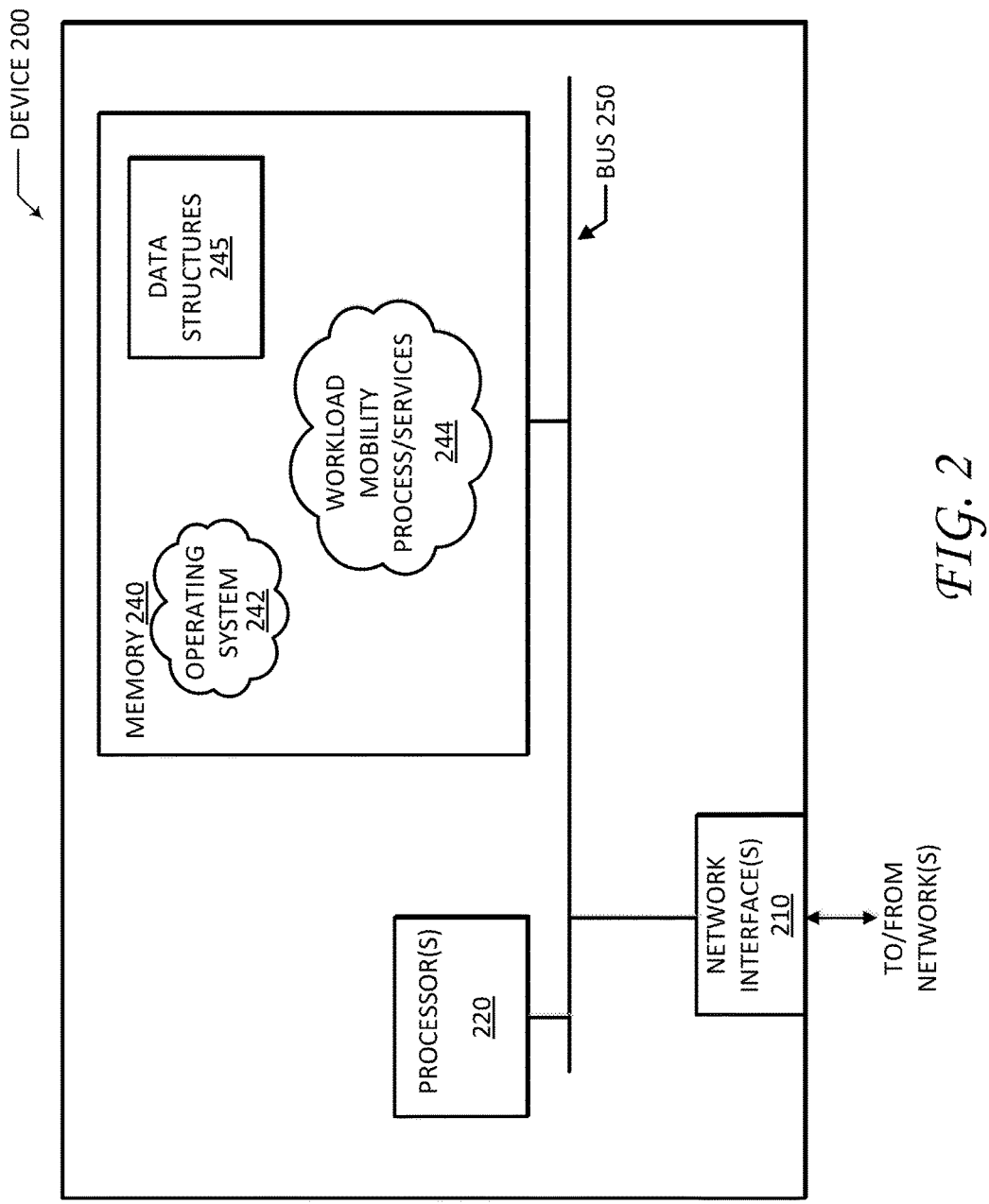
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) 200 that may be used with one or more embodiments described herein, e.g., particularly as a managing network entity such as a network slice manager or similar component/entity employed within a network slicing management and orchestration environment.

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art. Notably, network interfaces 210 may represent new blockchain network interfaces (e.g., "BCx", "BCy", and/or "BCz") for exchanging messages with various NFs of SBA 132, as discussed in greater detail below.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "workload mobility" process/service 244, as described herein. Note that while process/service 244 is shown in centralized memory 240, some embodiments provide for these processes/services to be operated in a distributed communication network.

Illustratively, the techniques described herein may be performed by hardware, software, and/or firmware, such as in accordance with the illustrative workload mobility process 244, which may contain computer executable instructions executed by processor 220 to perform functions relating to authenticating NFs, VNFs, and so on, with a distributed ledger technology entity (e.g., a federated, sponsored, or otherwise authorized Blockchain Authentication Function (BAF) entity), as discussed in greater detail below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having workload mobility process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, a transition is currently underway from existing 4G networks to new 5G networks, which includes a new service-oriented architecture (e.g., SBA 132—FIG. 1). Traditional processes employed by 3G and 4G networks to provision network resource and support UE mobility (e.g., registration, session establishment, session maintenance) were developed and optimized based on then-existing voice network (e.g., circuit-switched) infrastructure and/or conventional data network (e.g., packet switched) infrastructure. However, 5G networks introduce a new infrastructure that supports the service-oriented architecture, which can provision network services/resources in a dynamic, scalable, and customizable fashion using, for example, network slices, micro-services, network functions virtualization (NFV), and so on. In the context of a network slice, each network slice can include an isolated set of programmable resources that may implement individual network functions and/or application services through software programs within a respective network slice, without interfering with other functions and services on coexisting network slices.

This infrastructure also creates opportunities to dynamically manage and share network resources within and across network domains, service providers, trust boundaries, and so on. In particular, this disclosure describes new mechanisms to improve workload mobility and network resource sharing using Distributed Ledger Technology (DLT) and blockchain smart contracts to provide security and establish trust within and between core networks.

Blockchain technologies generally facilitate transparent, verifiable, and secure digital asset transactions with proof of rights and ownership. For example, blockchain technologies generally employ distributed ledger technology (DLT) with built-in cryptography to enable open and trusted exchanges over the internet without requiring central servers and/or independent trusted authorities. However, despite its advantages, existing protocols/network architectures in the telecommunications context generally fail to support native blockchain technologies due, in part, to underlying security requirements for initial registration processes. For example, while blockchain technologies can be employed within existing telecommunication networks, mobile network operators and/or mobile network entities are generally unaware of blockchain transactions because such blockchain transactions generally only occur after a mobile session is established (e.g., using overlay messages), which in turn, inhibits blockchain technology integration and participation by mobile service providers.

Accordingly, embodiments of this disclosure provide a native blockchain platform that employs workload mobility processes (e.g., workload mobility process 244) to improve core network trust amongst network entities and service providers alike. For example, these workload mobility processes can include blockchain security operations to authenticate virtual workloads, establish a trusted boot, as well as remotely attest for the integrity of a workload at a time after boot. These blockchain operations can establish blockchain security credentials for various NFs (e.g., AMF, SMF, UPF, NSSF, NRF, etc.), register these NFs with blockchain service providers (sponsored/federated), and establish smart contracts between the NFs and the blockchain service providers using the distributed permissions ledger. In turn, these "trusted" NFs may be inter-operable and more easily shared within and between mobile network service providers. Similarly, the blockchain operations can also be applied to secure virtual workloads (e.g., VNFs) and establish trust through smart contracts as the virtual workloads migrate across distributed datacenters—e.g., within different domains of the same mobile service provider, across multiple service providers, and so on. In general, these workload mobility processes may satisfy security requirements amongst and between mobile network service providers, thus reducing the complexity and cost associated with the existing patchwork of varying levels of security.

Figure 3A:
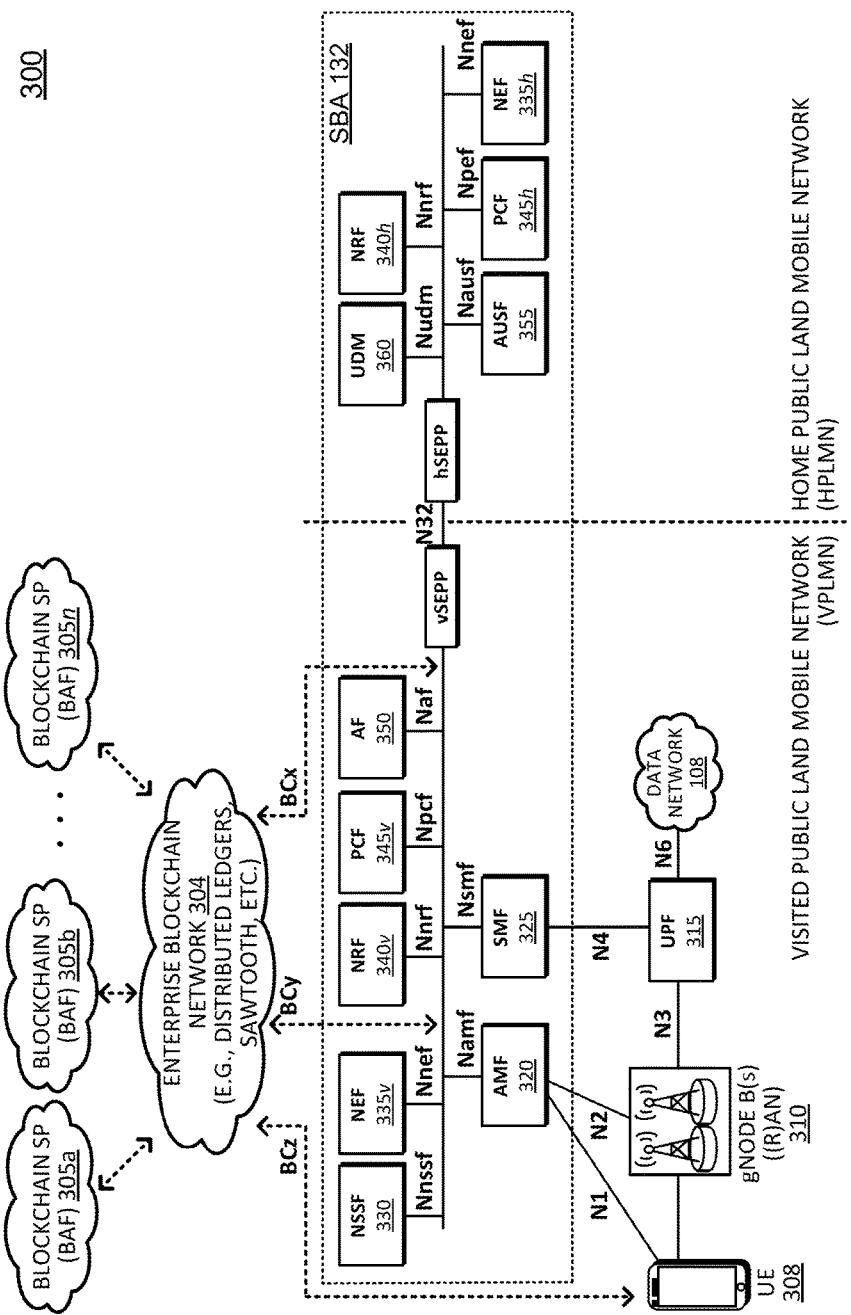
FIG. 3A illustrates schematic block diagram of a roaming architecture with a local breakout scenario for a service based interface representation of a Service Based Architecture (SBA), showing a natively integrated blockchain platform.
Figure 3B:
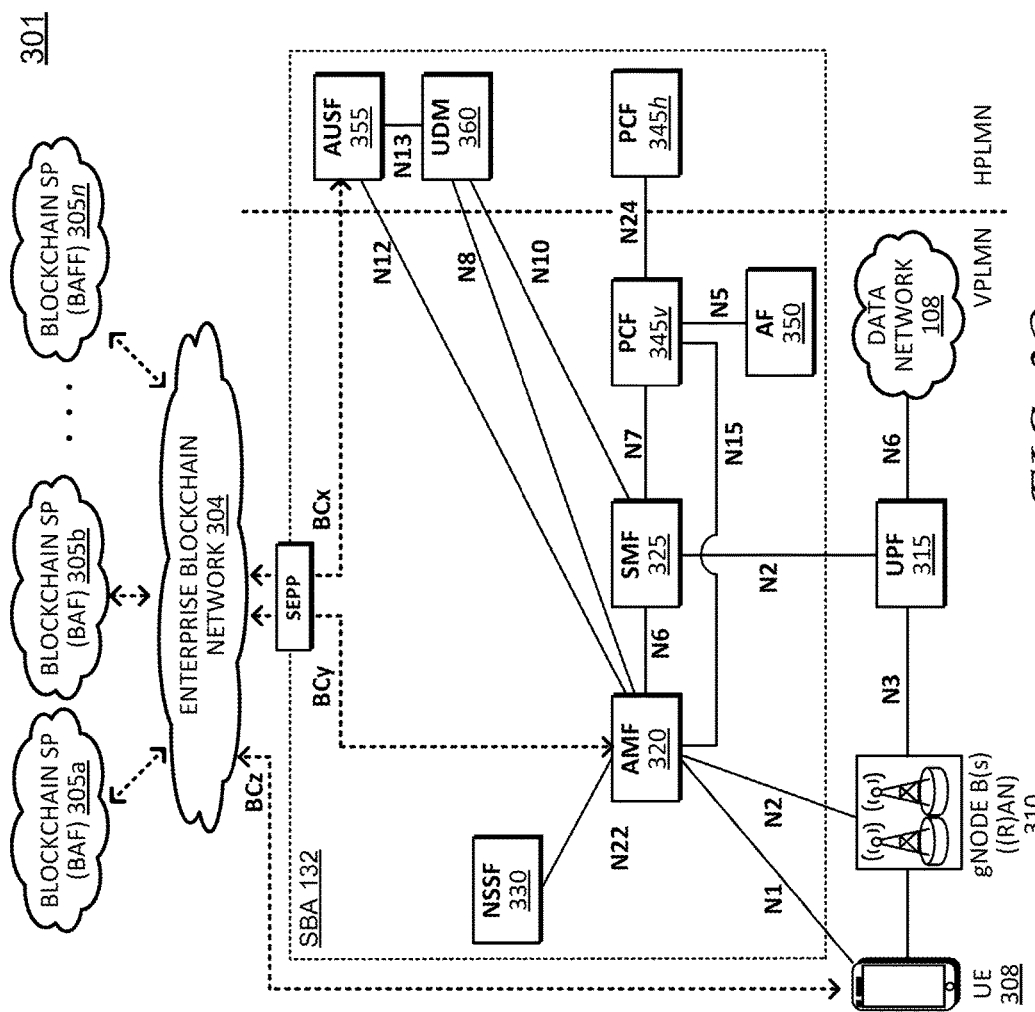
FIG. 3B illustrates a schematic block diagram of reference point representation of the roaming architecture shown in FIG. 3A.

Referring again to the figures, FIG. 3A illustrates a schematic block diagram 300, showing a blockchain platform natively integrated with a SBA 132 for an exemplary 5G network (e.g., 5G network 130), and FIG. 3B illustrates a schematic block diagram 301, showing a reference point architecture for the blockchain platform of FIG. 3A. Collectively, FIGS. 3A and 3B show a native blockchain platform represented by an enterprise blockchain network 304, which interconnects blockchain service providers (SPs) or Blockchain Authentication Function (BAF) entities 305a-305n (e.g., distributed ledger technology (DLT) entities, etc.) with various network entities/functions over blockchain network interfaces BCx, BCy, and BCz, which may be represented by the network interfaces 210 for device/entity 200, discussed above.

The illustrated blockchain interfaces BCx, BCy, and BCz represent new communication links that facilitate exchanging messages or data packets between blockchain service providers (e.g., BAF(s) 305) and mobile providers (e.g., SBA 132, including underlying NFs). Notably, while some blockchain network interfaces are shown as directly connected to certain NFs of SBA 132, it is appreciated that these blockchain interfaces (e.g., BCx and BCy) can form interfaces for any of the NFs that form SBA 132 and/or other mobile operators. For example, the blockchain network interfaces may connect to the various NFs and/or mobile operators using a Security Edge Protection Proxy (SEPP) (e.g., vSEPP/hSEPP) entity, which generally operates to protect control plane traffic exchanged between PLMNs, as is appreciated by those skilled in the art.

In general, the blockchain interfaces BCx, BCy, and BCz may be used to carry information relating to parameters such as authentication vectors, UE identity (SIM/eSIM or encrypted identity), authorization parameters (e.g., eWallet), resource availability/utilization, resource sharing parameters, and so on. More specifically, blockchain interface BCx can facilitate exchanging messages related to policy request, authorization, network usage, lawful intercept, accounting, and the like. Blockchain interface BCy can facilitate exchanging messages related to secondary authentication, authorization, resource sharing, lawful intercept, network slicing, etc. Blockchain interface BCz can facilitate exchanging messages related to standalone Authentication public key pre-set, authorization, Distributed Ledger Technology query/set, etc.

Blockchain network 304 generally facilitates sharing network resources and provides security for network functions (NFs) that form SBA 132 to create specific trust boundaries across multiple service providers using distributed blockchain ledgers. Blockchain network 304 may represent an open source blockchain network or platform such distributed ledgers, hyperledger Sawtooth, and the like.

With specific reference to FIG. 3A, schematic block diagram 300 illustrates a roaming architecture with a local breakout scenario for a service based interface representation of SBA 132. As shown, this roaming architecture includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming if to receive services from abroad. A HPLMN refers to the subscriber's home network (e.g., domestic carrier) while VPLMN refers to the subscriber's abroad network (where the UE may be registered while roaming). While FIG. 3A illustrates the roaming architecture with the local breakout scenario, it is appreciated other roaming architectures may be employed (e.g., home routing, etc.). Further, as shown here, some network entities such as the Session Management Function (SMF) and the User Plane Function(s) (UPF(s)) involved in a PDU session are under the control of the VPLMN.

Network entities or NFs that form SBA 132 include AMF 320, SMF 325, Network Slice Selection Function (NSSF) 330, Network Exposure Function (NEF) 335v | 335h, Network Repository Function (NRF) 340v | 340h, Policy Control Function (PCF) 345v | 345h, and Application Function (AF) 350. These network entities can be implemented either as a network element on a dedicated hardware, as a software instance running on a dedicated hardware, or as a virtualized function (e.g., VNF) instantiated on an appropriate platform, e.g., a cloud infrastructure, as is appreciated by those skilled in the art.

In general, UE 308 connects to RAN/Access Network (AN) 310 as well as AMF 320. Here, the RAN can include a base station while the AN can include a base station supporting non-3GPP access, e.g., Wi-Fi access. AMF 320 provides UE-based authentication, authorization, mobility management, etc. SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. AF 350 generally provides information on packet flows to PCF 345v, which is responsible for policy control in order to support Quality of Service (QoS). Based on the information from AF 350, PCF 345v determines policies about mobility and session management for proper AMF/SMF operations. AUSF 355 stores authentication data for UE 308, and UDM 360 stores subscription data for UE 308. Data network 108 provides Internet access or operator services. The foregoing operations (and additional functionality) for respective network entities can be found in 3GPP Technical Specification (TS) 23.501 v 15.2.0 and TS 23.502v15.2.0, which is incorporated by herein by reference to its entirety.

FIG. 3B illustrates a schematic block diagram 301, showing a reference point interface representation of SBA 132 (e.g., with a local breakout scenario). Reference point representations often help develop detailed call flows in a normative standardization, which are illustrated in FIG. 6A and FIG. 6B (described below). It should be noted, for sake of clarity, certain network entities (e.g., NEF 335, NRF 340, etc.) are not shown by schematic block diagram 301. However, it is appreciated any of the illustrated network entities can interact with the non-illustrated entities as appropriate.

As mentioned, the native blockchain platform shown in FIGS. 3A and 3B includes enterprise blockchain network 304, which interconnects various blockchain service providers (SPs), represented as Blockchain Authentication Function (BAF) entities 305a-305n, with mobile network entities over blockchain network interfaces BCx, BCy, and BCz. In general, this native blockchain platform establishes security within core networks to improve workload mobility and network resource sharing using Distributed Ledger Technology (DLT), such as blockchain smart contracts.

Figure 4A:
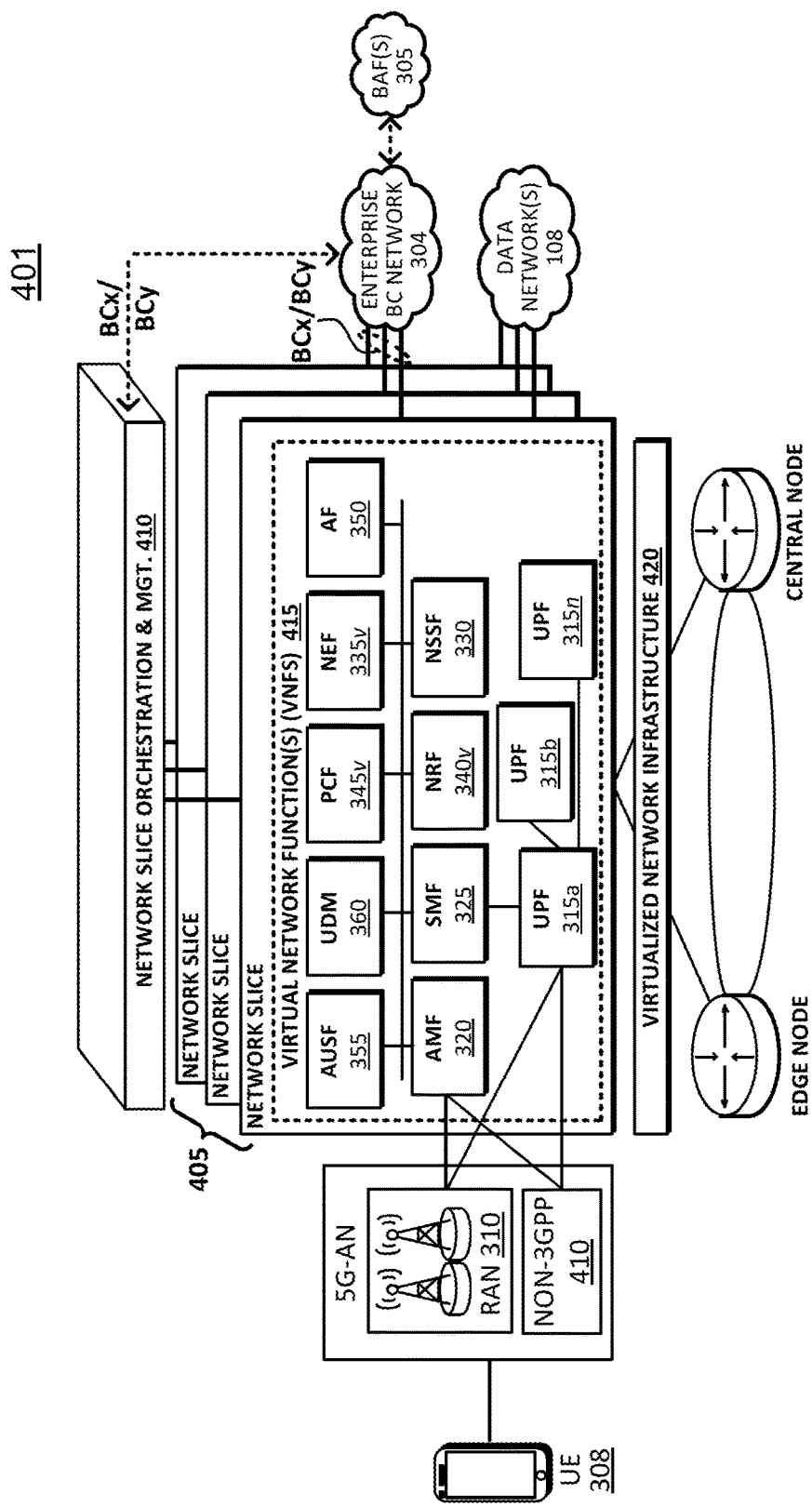
FIG. 4A illustrates schematic block diagram of a Network Functions Virtualization (NFV) architecture, including a natively integrated blockchain platform, in a 5G network context.
Figure 4B:
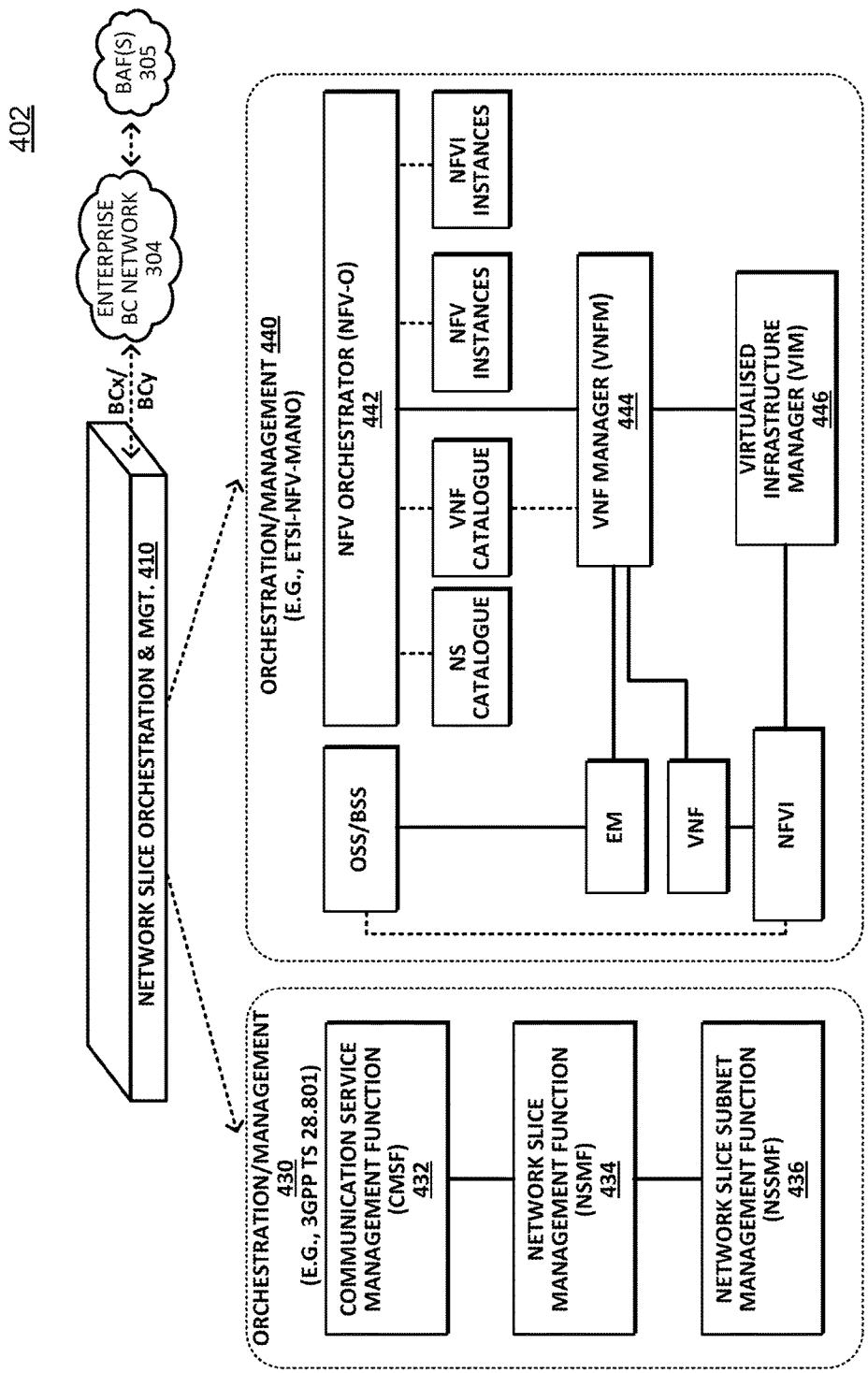
FIG. 4B illustrates a schematic block diagram of two frameworks for employing a network slice orchestration and management layer with the natively integrated blockchain platform.

FIG. 4A illustrates a schematic block diagram 401, showing a Network Functions Virtualization (NFV) architecture, including the natively integrated blockchain platform, in a 5G network context (e.g., 5G network 130), and FIG. 4B illustrates a schematic block diagram 402 of two frameworks for employing a network slice orchestration and management layer with the natively integrated blockchain platform.

Collectively, FIGS. 4A and 4B show a virtualized approach for natively implementing the blockchain platform in a 5G network. Further, while 3GPP TS 23.501, 3GPP TS 28.530, and 3GPP TS 28.531 describe general management, orchestration, slice selection, and so on, they do not specifically define a NFV architecture. Accordingly, while there are a variety of NFV architectures available, the particular NFV architecture shown in FIGS. 4A and 4B are provided for purpose of illustration and discussion, not limitation.

Network functions virtualization (NFV) generally refers to a network architecture that replaces network functions on dedicated appliances—e.g., routers, load balancers, firewalls, etc.—with virtualized instances running as software on commercial off-the-shelf (COTS) hardware. Put differently, NFV architectures represent a logical abstraction of underlying hardware and software networking resource where the underlying physical hardware forwards packets, while the virtual network (software) provides an intelligent abstraction to facilitate deploying and managing network services/network resources.

Referring again FIG. 4A, the NFV architecture includes a network slice orchestration and management layer 410, network slices 405, and a Virtualized Network Infrastructure (VNI) layer 420. Notably, VNFs 415 can represent virtualized NFs of SBA 132.

Network slice orchestration and management layer 410 is generally responsible for managing underlying network slices 405, including on-boarding new network services and virtual network function (VNF) packages, network slice lifecycle management, global resource management, validation and authorization of Network Functions Virtualization Infrastructure (NFVI) resource requests, manages lifecycles of VNF instances, and so on.

Virtualized Network Infrastructure (VNI) 420 generally controls and manages the NFV compute, storage, and network resources within an operator's infrastructure subdomain. In addition, VNI 420 is also responsible for monitoring performance measurements and events. While the VNI 420 is shown as a separate layer from the network slice orchestration and management layer 410, it is appreciated that such layers may be incorporated into a single orchestration/management layer.

The NFV architecture supports multiple network slices 405 that are created atop a shared physical infrastructure. A network slice represents a logical end-to-end network service and can be dynamically created. A given User Equipment (UE) may have access to multiple slices over the same Access Network (e.g. over the same radio interface), and each slice may serve a particular service type with agreed upon Service-level Agreement (SLA). Various aspects and operations of network slicing are described in 3GPP TS 23.501, 3GPP TS 28.530, and 3GPP TS 28.531.

In addition to the network slice functionality and operations set forth in the 3GPP TS(s), FIG. 4A also illustrates a natively integrated blockchain platform, as represented by enterprise blockchain network 304, BAFs 305, and blockchain network interfaces BCx and BCy. Notably, blockchain network interfaces BCx and BCy represent communication links for exchanging data or messages between the network slice orchestration and management layer 410 as well as between the various network slices 405. As discussed in greater detail herein, the blockchain platform establishes trust for core network entities, workloads, and other (V)/NFs within a network slice. In turn, this trust allows network resources associated with these entities, workloads, and/or network functions to be more easily shared across domains as well as between mobile service providers. The blockchain platform particularly establishes this trust through authentication processes where the entities, workloads, and/or network functions are initially registered with appropriate BAF(s) 305. During the initial registration, public keys may be exchanged, as is appreciated by those skilled in the art. When a workload request indicates a need for additional resources in a particular network domain, existing network resources and/or new network resources are authenticated with the appropriate BAF 305 and, upon successful authentication, are instantiated in and/or migrated to the particular domain as appropriate. The authentication processes is often initiated by entities that form the network slice orchestration and management layer 410.

Referring to FIG. 4B, schematic block diagram 402 illustrates two frameworks of network slice orchestration and management layer 410. In particular, the first framework is defined by 3GPP TS 28.801 with functional blocks associated with an orchestration/management layer 430, and the second framework is defined by the European Telecommunications Standards Institute Industry Specification Group, which developed a framework for Network Functions Virtualization (NFV) management and organization (MANO) (collectively, ETSI-NFV-MANO) with functional blocks associated with an orchestration/management layer 440.

It should be noted that orchestration/management layer 430 and orchestration/management layer 440 may be complimentary and/or overlapping in nature. For example, while the 3GPP technical specifications' currently provide high level requirements for network slice orchestration and management corresponding to the functional blocks of orchestration/management layer 430, the ETSI-NFV-MANO framework (orchestration/management layer 440) may be adopted (in part or as a whole) to achieve these high level requirements. Although the 3GPP TS 28.801 indicates a close collaboration with organizations such as ETSI to develop relevant network virtualization standards to ensure network slices can run in virtualized environments with seamless end-to-end network slice resource management capability, the illustrated ETSI-NFV-MANO framework may/may not be adopted and/or revised. However, for purposes of discussion, reference will be made to specific functional blocks for the illustrated frameworks, but it is appreciated that various substitutions of analogous or substantially similar components may be employed as appropriate.

Referring to orchestration/management layer 430, 3GPP TS 28.801 describes network slice instance lifecycle management and provides three (3) management logical functions—namely a Communication Service Management Function (CMSF) 432, a Network Slice Management Function (NSMF) 434, and a Network Slice Subnet Management Function (NSSMF) 436.

CSMF 432 is generally responsible for translating the communication service related requirement to network slice related requirements, NSMF 434 is generally responsible for management and orchestration of Network Slice Instances, and determines network slice subnet related requirements from network slice related requirements, and NSSMF 436 is generally responsible for management and orchestration of network slice subnet instance(s) (NSSI(s)). Collectively, the functional blocks of orchestration/management layer 430 can create customized virtual networks to meet the varying needs of applications, services, devices, customers or operators. In addition, these functional blocks will enable a distributed cloud to help to create flexible and programmable networks.

As mentioned, the operations of these functional blocks may be implemented by existing frameworks such as the ETSI-NFV-MANO framework represented by orchestration/management layer 440. The ETSI-NFV-MANO framework may be used, for example, to manage and orchestrate sharing of resources in a datacenter. In general, this framework facilitates deploying and connecting services as they are decoupled from dedicated physical devices and moved to virtual machines (VMs).

While the ETSI-NFV-MANO framework includes a number of network elements, for purposes of simplicity and discussion herein, we focus on three functional blocks—i.e., an NFV Orchestrator (NFV-O) 442, a VNF Manager (VNF-M) 444, and a Virtualized Infrastructure Manager (VIM) 446—which deploy and connect functions and services throughout a network.

NFV-O 442 manages on-boarding, resources and policies, and integrates new network services and VNFs into a virtual framework. NFV-O 442 also validates and authorizes NFV Infrastructure (NFVI) resource requests (not shown). VNF-M 444 operates in conjunction with NFV-O 442 and VIM 446, and generally provides lifecycle management for VNFs as well as supports interoperability of software-defined network elements. For example, VNF-M 444 can instantiate one or more new VNFs, scale VNFs, update and/or upgrade VNFs, and also terminate VNFs. In addition, VNF-M 444 monitors key performance indicators (KPIs) during VNF lifecycles, which are important when performing scaling operations, healing operations, and the like. In this fashion, VNF-M 444 maintains virtualized resources and supports VNF functionality.

VIM 446 controls and manages the NFV infrastructure, including network resources such as compute, storage, network, and the like. VIM 446 is flexible and may be configured to handle a certain type of NFVI resource (e.g. compute-only, storage-only, networking-only), and/or it may be capable of managing multiple types of NFVI resources (e.g. in NFVI nodes). In operation, VIM 446 orchestrates allocation, upgrades, releases, and reclaims of NFVI resources, manages associations between virtual and physical elements, and maintains an inventory of allocated virtual/physical resources.

Orchestration/management layer 430 and orchestration/management layer 440 can communicate with Enterprise Blockchain Network 304 and thus, BAFs 305 over blockchain network interfaces BCx/BCy. In this fashion, BAFs 305 can facilitate standard communications between blockchain service providers and mobile network service providers. In some embodiments, the illustrated orchestration and management layers may employ a Security Edge Protection Proxy (SEPP) (e.g., vSEPP/hSEPP) entity to communicate messages with BAFs 305 using HTTP REST API protocols, as is appreciated by those skilled in the art.

As described in greater detail with reference to FIGS. 5A and 5B (below), one or more of the functional blocks/network entities for respective frameworks can exchange authentication vectors, UE identities (SIM/eSIM or encrypted identity), authorization parameters (e.g. eWallet), resources availability/utilization, resource sharing parameters, etc., with respective BAFs 305 to authenticate corresponding workloads (e.g., VMs, micro services, etc.), NFs, VNFs, network resources, and so on.

For example, in operation, BAFs 305 can authenticate and assign blockchain security to workloads during initial instantiation. As these workloads are moved or migrated across multi-site distributed NFVI, the BAFs 305 can authenticate and authorize these workloads in an efficient, flexible, and scalable manner. In this fashion, the BAFs 305 may be used to establish a trust relationship between workload (VNF/VM) and NFVI, which can facilitate sharing network resources across multiple service providers.

Figure 5A:
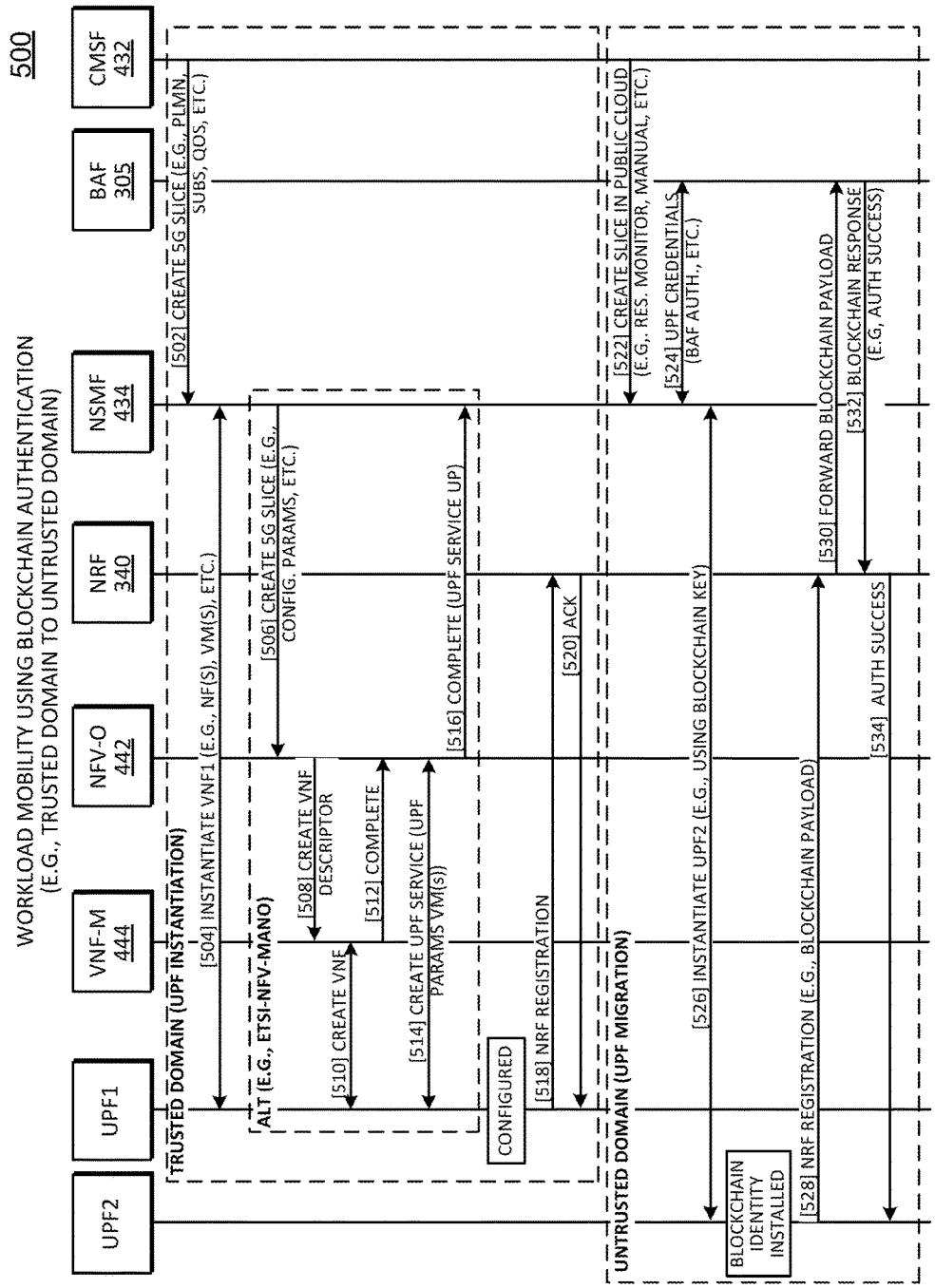
FIG. 5A illustrates a schematic signaling diagram, showing aspects of a workload mobility process for migrating a workload between network domains.

Referring again to the figures, FIG. 5A illustrates a schematic signaling diagram 500, showing aspects of the disclosed workload mobility process. Here, schematic signaling diagram 500 shows workload mobility in the context of migrating a VNF workload (e.g., a UPF) from a trusted network domain to an untrusted network domain. FIG. 5B illustrates a schematic signaling diagram 501, showing additional aspects of the disclosed workload mobility process, where the VNF workload (e.g., UPF) migrates within a PLMN and/or between mobile service providers. It should be noted that while schematic signaling diagrams 500 and 501 describe workload mobility in the context of instantiating or migrating a User Plane Function (UPF) entity, the processes described may be readily applied to any number of NFs. In addition, the illustrated UPF entities—UPF1 and UPF2—may represent Virtual Network Function (VNF) workloads, which may include any number of Virtual Machines (VMs) and/or other network resources.

Schematic signaling diagrams 500 and 501 also illustrate various NFs and other network management entities that support the workload mobility processes of this disclosure. In particular, schematic signaling diagrams 500 and 501 include CMSF 432, which manages the lifecycle of network services such as internet services, enterprise applications, gaming, voice, messaging, and so on. In the particular context of 5G networks, each service requires resources, which are defined, instantiated, and managed (e.g., life-cycle management) by CMSF 432. BAF 305, described above, manages a distributed ledger for authentications, service authorization, smart contracts and security. NSMF 434 represents a cloud manager or slice manager. As discussed, network slices are logical collections of virtual network functions (VNF) (e.g., such as AMF, SMF, UPF, NRF etc.) NSMF 434 creates these VNFs and associates the VNFs into a service chain to deploy 5G services. NRF 340 generally maintains status of each VNF after instantiation by tracking resources (compute, memory, network and utilization etc.) and maintaining repository information for deployed VNFs. NFV-O 442 orchestrates and generally manages resources for VNFs, including device configurations, service configuration such as packet core, etc. NFV-O 442 maintains stateful data for each VNF and VM's deployed and configured, and synchronizes a configurations database. VNF-M 444 instantiates each VNF based on a VNF-descriptor file, which includes configuration parameters, and manages the lifecycle for each VNF. User Plane Function(s)—UPF1 and UPF2—generally handle user plane traffic between UE attached to a network and applications/servers (e.g., the Internet). UPF1 and UPF2 also manage manages session connectivity, IP address, billing, mediations and QoS managements, and so on. In schematic signaling diagram 500, UPF1 may be deployed in private cloud, while UPF2 may be deployed in a public cloud or other service provider. It is appreciated that schematic signaling diagrams 500 and 501 can include additional network entities and/or NFs (e.g., SMF, AMF, etc.) and signaling there-between, however, such network entities and/or NFs are not shown for sake of clarity.

Steps 502-520 are the same for schematic signaling diagrams 500 and 501, and generally represent signaling to instantiate UPF1 in a "trusted" domain. In particular, at step 502, CMSF 432 sends NSMF 434 an instantiation request for a new network slice. The instantiation request typically includes parameters such as number of subscribers, QoS, service definitions, and PLMN network details. In response, NSMF 434 instantiates, at step 504, UPF1 inside a new network slice and forwards all parameters. Here, as assume that the AMF and SMF (not shown) are shared across multiple network slices.

Steps 506-516 particularly show underlying signaling for instantiating UPF1 in the context of the ETSI-NFV-MANO framework. In particular, at step 506, NSMF 434 sends configuration parameters to NFV-O 442, which builds a VNF-descriptor file for each VM inside the specific VNF (e.g. a UPF VNF might include four VMs that perform smaller subnet of functions). NFV-O 442 sends the VNF descriptor file to VNF-M 444 at step 508. Notably, VNF descriptor file defines how UPF will be to be instantiated.

VNF-M 444 receives the descriptor file and creates, at step 510, VMs for UPF1 on a cloud infrastructure. Notably, this cloud infrastructure may also be referred to as a VIM (Virtual Infrastructure Manager) (e.g., VIM 446 (not shown)).

Once UPF1 is instantiated, it sends, at step 512, a completion status to VNF-M 444. VNF-M 444 marks UPF1 as complete and begins monitoring resources such as CPU, memory, Input/output (I/O), hard-disk utilization etc. VNF-M 444 also notifies NFV-O 442 about completion of VNF instantiation.

At step 514, NFV-O 442 performs additional service configurations directly with UPF1. For example, some service configurations include Access point Name (APN), IP addresses pool, QoS, billing, and so on. In general, service configurations define the parameters required to set-up a particular UPF service on a VNF.

After UPF1 service is configured, tested and running, NFV-O 442 notifies NSMF 434 at step 516. In addition, UPF1 also sends a registration message at step 518 to register with NRF 340 for management of network resources. At step 520, NRF 340 provides an acknowledgement message to UPF1. Once UPF1 is instantiated in a domain, it may be migrated or moved to another domain based on a workload mobility request. For example, steps 522-534 in schematic signaling diagram 500 illustrate signaling for migrating UPF1 between domains (e.g., trusted to untrusted), while steps 536-548 in schematic diagram 501 illustrate signaling for migrating UPF1 within a PLMN and/or between different mobile service providers.

Workload Mobility Using Blockchain Authentication Between Domains (e.g., Trusted/Untrusted)

Continuing to refer to FIG. 5A, schematic signaling diagram 500 provides steps 522-534 for migrating a workload, as discussed above. Migrating a workload (e.g., the VNF associated with UPF1) begins at step 522, where CMSF 432 determines that network resources configured with a particular service provider are insufficient and initiates a workload mobility process. The workload mobility process may generally refer to migrating an existing VNF to address the need for network resources and/or it may refer to instantiating a new VNF to host the same service for more capacity. Here, at step 522, CMSF 432 begins slice instantiation in public cloud by sending workload requirements to NSMF 434.

At step 524, NSMF 434 authenticates the VNF workload with BAF 305 (e.g., a blockchain distributed ledger). For example, NSMF 434 can communicate with BAF 305 over blockchain network interfaces BCy or BCz (discussed above). If new network resources for a VNF are to be initially instantiated, NSMF 434 sends a public key and registers the workload (e.g., UPF1) with BAF 305. However, if existing network resources for the workload are to be migrated, NSMF 434 selects an appropriate BAF (e.g., BAF 305) for authentication based on blockchain credentials previously assigned to the VNF, and authenticates the VNF with BAF 305 using public-keys, as is appreciated by those skilled in the art. Notably, authentications and key exchanges are performed for each VM associated with VNF.

At step 526, NSMF 434 instantiates a new UPF (e.g., UPF2) in the public cloud domain. As mentioned, instantiating UPF2 in the public cloud domain can include adding new resources (initial instantiation) and/or migrating an existing UPF from a private cloud (trusted domain) to the public cloud (untrusted domain). In either scenario, NSMF 434 sends blockchain authentication credentials during instantiation to register the workload (for adding new network resources) or to authenticate the workload (for migrating existing network resources). Notably, signaling for NFV-O 442 and VNF-M 444 are not shown because each public-cloud may use a different form of VNF management/orchestration. A blockchain identity or blockchain credentials is/are installed with the VNF in public cloud to create a blockchain signed VNF (or a signed workload). This signed workload establishes a level of trust for subsequent migration to other domains and/or between network service providers.

At step 528, UPF2 further registers with the core network (e.g., SBA 132) by sending NRF 340 the blockchain credentials, and at step 530, NRF 340 forwards the blockchain credentials to BAF 305 (e.g., a blockchain distributed ledger technology (DLT) entity), which verifies the blockchain credentials (previously signed in step 524). This registration process continues with step 532 and step 534 where BAF 305 sends a response back to NRF 340 indicating a successful authentications, and NRF 340 sends a corresponding response to UPF2, respectively. Messages between NRF 340 and BAF 305 can be exchanged over blockchain network interfaces BCy or BCz and further, such messages may be in the form of HTTP REST API protocol. It should also be noted, there may be additional signaling to release the VNF workload associated with UPF1 (from the private cloud domain) after successful migration.

Figure 5B:
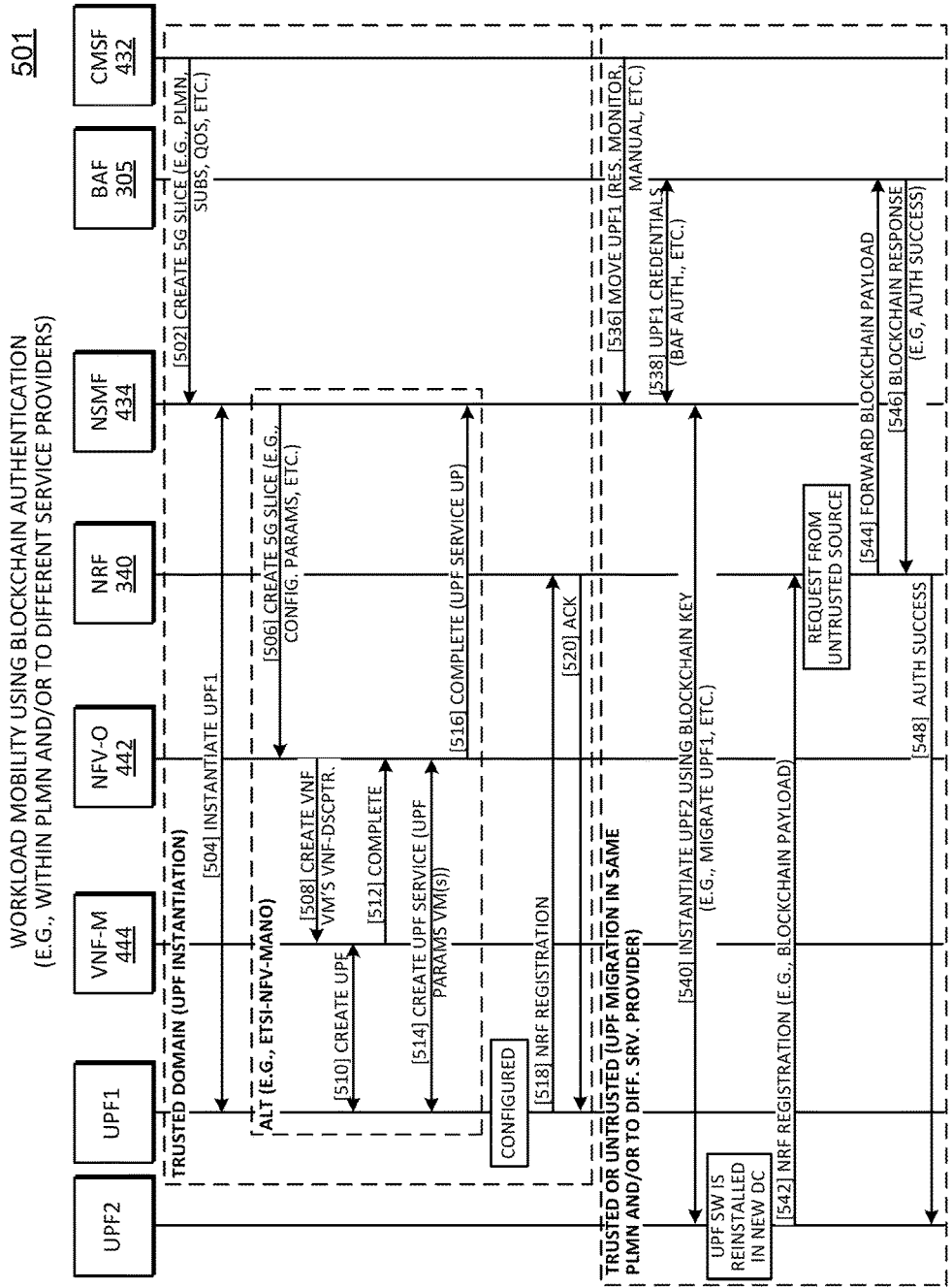
FIG. 5B illustrates a schematic signaling diagram, showing additional aspects of the workload mobility process for migrating a workload between datacenters of one mobile service provider or between different mobile service providers.

Workload Mobility Using Blockchain Authentication within a PLMN and/or to a Different Mobile Service Provider Turning to FIG. 5B, schematic signaling diagram 501 provides steps 536-548 for migrating UPF1 in the same PLMN and/or to a different mobile service provider. Notably, steps 502-520 represent signaling to instantiate UPF1 in a "trusted" domain and are discussed in greater detail above.

Beginning at step 536, CMSF 432 determines additional network resources are required in a different datacenter (e.g., within the same PLMN for the same service provider) and/or the VNF associated with the workload for UPF1 should be moved to another mobile service provider. As shown, step 536 represents the start of another workload request, where CMSF 432 sends parameters such as resources utilization, manual interventions etc. to NSMF 434.

At step 538, NSMF 434 authenticates the VNF workload with BAF 305, similar to step 524 (discussed above). For example, NSMF 434 can communicate with BAF 305 over blockchain network interfaces BCy or BCz. If new network resources for a VNF are to be initially instantiated, NSMF 434 sends a public key and registers the workload (e.g., UPF1) with BAF 305. However, if existing network resources for the workload are to be migrated, NSMF 434 selects an appropriate BAF (e.g., BAF 305) for authentication based on blockchain credentials previously assigned to the VNF, and authenticates the VNF with BAF 305 using public-keys, as is appreciated by those skilled in the art. Notably, authentications and key exchanges are performed for each VM associated with VNF. Here, NSMF 434 authenticates the existing VNF workload (UPF1) using the prior assigned blockchain credentials.

After receiving an indication of a successful authentication, NSMF 434 instantiates, at step 540, UPF2 in a public cloud and/or migrates existing UPF1 to another datacenter or to a different mobile service provider. Notably, NSMF 434 sends blockchain authentication credentials during instantiation, which credentials may be used to authenticate UPF1 during subsequent migration. Notably, signaling for NFV-O 442 and VNF-M 444 are not shown because each public-cloud may use a different form of VNF management/orchestration. A blockchain identity or blockchain credentials is/are installed with the VNF in public cloud to create a blockchain signed VNF (or a signed workload). This signed workload establishes a level of trust for subsequent migration to other domains and/or between network service providers.

At step 542, UPF2 further registers with the core network (e.g., SBA 132) by sending NRF 340 its blockchain credentials, and at step 544, NRF 340 forwards the blockchain credentials to BAF 305 (e.g., a blockchain distributed ledger technology (DLT) entity), which verifies the blockchain credentials previously signed in step 538. This registration process continues with step 546 and step 548 where BAF 305 sends a response back to NRF 340 indicating a successful authentications, and NRF 340 sends a corresponding response to UPF2, respectively. Messages between NRF 340 and BAF 305 can be exchanged over blockchain network interfaces BCy or BCz and further, such messages may be in the form of HTTP REST API protocol. It should also be noted, additional signaling to release the VNF workload associated with UPF1 from its prior domain/mobile service provider after successful migration.

Collectively, FIGS. 5A and 5B show various aspects of the disclosed workload mobility process. While specific references may have been made to particular network functions (e.g., UPF1 and UPF2), it is appreciated that these workload mobility processes may be readily adapted and applied for instantiating and/or migrating any type of NF or VNF, including associated network resources.

Figure 6:
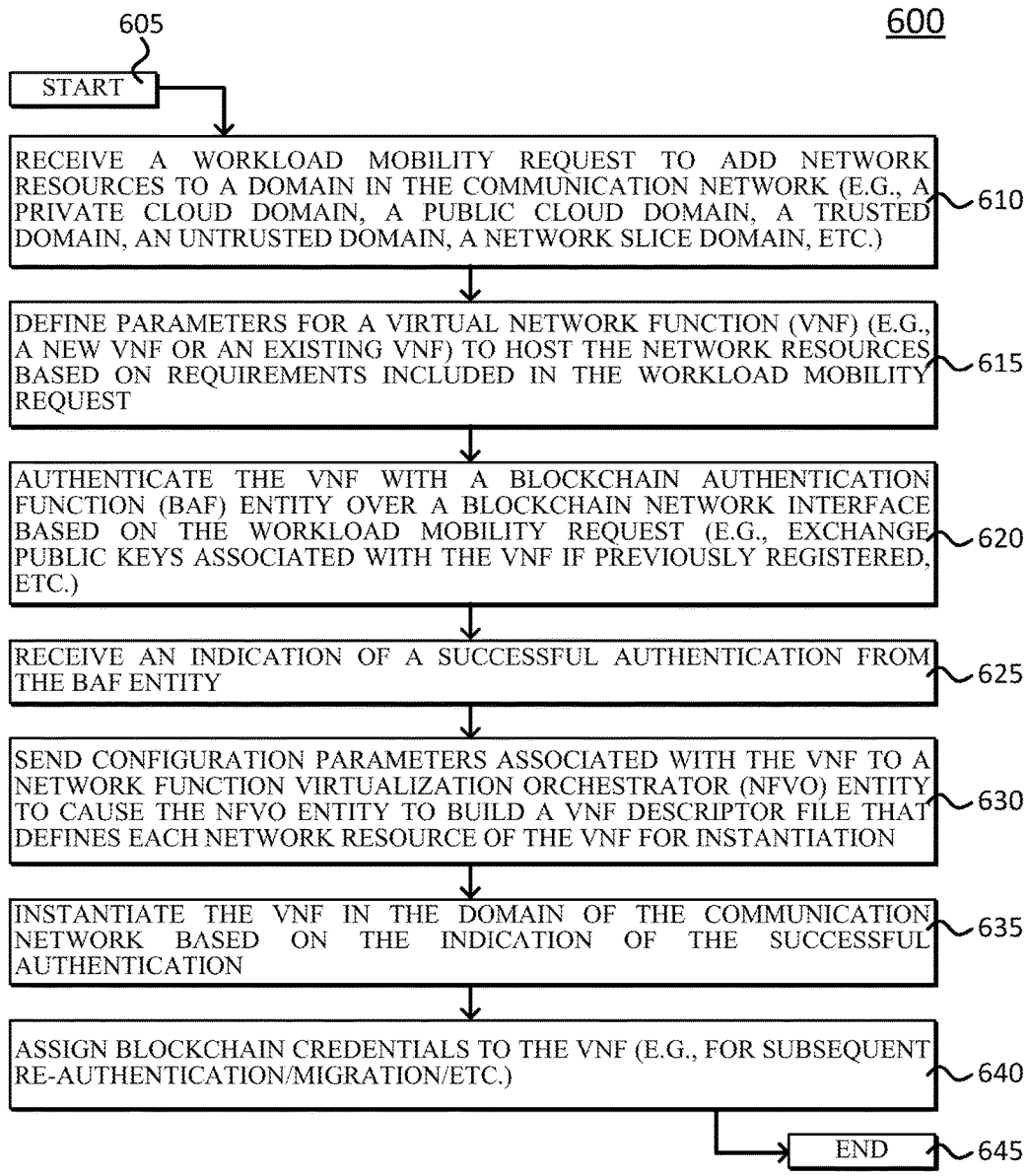
FIG. 6 illustrates an example simplified procedure for improving workload mobility and dynamically sharing resources in a telecommunication network, in accordance with one or more embodiments of the disclosed workload mobility processes.

FIG. 6 illustrates an example simplified procedure 600 for improving workload mobility and dynamically sharing resources in a telecommunication network in accordance with one or more embodiments of the workload mobility processes described above. Procedure 600 can particularly represent operations performed by one or more entities that form part of a network slice orchestration and management layer (e.g., layer 410) for a NFV architecture in the context of a telecommunications network (e.g., 3G, 4G, 5G, etc.) For example, for purposes of discussion, operations described by procedure 600 will be from the perspective of a network slice manager entity (e.g., a cloud or slice manager such as NSMF 434).

Procedure 600 begins at step 605 and continues on to step 610 where, as discussed above, the network slice manager (e.g., an entity, a node, etc.) receives a workload mobility request from a service manager (e.g., CMSF 432). Notably, the workload mobility request can indicate network resources are required in a particular domain of the communication network, and the domain can include, for example, a private cloud domain, a public cloud domain, a trusted domain, an untrusted domain, a network slice domain, and so on.

The network slice manager entity may further define, at step 615, parameters for a virtual network function (VNF), such as a new VNF and/or an existing VNF, to host the network resources based on requirements included in the workload mobility request. Notably, as discussed above, this VNF can include a core network NF (e.g., such as the various NFs that form SBA 132) and/or the VNF can include a number of UPFs associated with UE. With respect to hosting the network resources, the VNF can include any number of Virtual Machines (VMs) and/or other virtual entities having functionality to satisfy the network resource requirement indicated in the workload mobility request.

Procedure 600 continues to step 620, where the network slice manager entity authenticates the VNF with a blockchain authentication function (BAF) entity over a blockchain network interface based on the workload mobility request. For example, the network slice manager can send the BAF entity public keys associated with the VNF for authentication. The BAF entity can compare the public keys to registered public keys previously registered for the VNF. If the public keys match, the BAF sends an indication of a successful authentication, which is received by the network slice manager at step 625. Notably, the network slice manager communicates with the BAF entity over a blockchain network interface (e.g., BCx and/or BCy) and, in some embodiments, may employ an intermediary Security Edge Protection Proxy (SEPP) entity for message exchanges. For SEPP communications, the network slice manager and/or the BAF entity may use HTTP REST application program interface calls, as is appreciated by those skilled in the art.

The network slice manager further sends, at step 630 configuration parameters associated with the VNF to a network function virtualization orchestrator (NFVO) entity (e.g., NFVO 442), which in turn, builds a VNF descriptor file that defines each network resource of the VNF for instantiation and generally coordinates instantiation procedures with a virtual network function manager (e.g., VNF-M 444). In this fashion, the network slice manager instantiates, shown by step 635, the VNF in the domain of the communication network based on the indication of the successful authentication. In some embodiments, the network slice manager further assigns blockchain credentials to the VNF, at step 640, for subsequent re-authentication, migration, etc. The blockchain credentials may be associated with a particular BAF 305, and can indicate the VNF is a signed and trusted workload.

Procedure 600 subsequently ends at step 645, but may return again to step 610 where the network slice manager receives a workload mobility request to add network resources to a domain. Notably, procedure 600 may be used to establish new network resources (e.g., new VNFs) or it may be employed to migrate existing network resources between domains. For example, the step of authenticating the VNF with the BAF entity (step 620) may be readily applied to authenticate existing or new VNFs. Likewise, the step of instantiating the VNF in the domain (step 635) can be adapted to instantiate new VNFs or migrate existing VNFs from a different domain. Notably, for migrating existing VNFs from a different domain, there are typically additional processes such as releasing the corresponding network resources from the different domain, as is appreciated by those skilled in the art.

It should also be noted that while certain steps within procedure 600 may be optional, and further, the steps shown in FIG. 6 are merely example steps for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, improve workload mobility and network resource sharing between domains of a telecommunication network (e.g., 4G/5G networks, etc.) using a natively integrated blockchain platform. In particular, these techniques leverage the blockchain platform to build trust by authenticating workloads, network functions (NFs), virtual network functions (VNFs), and network resources associated therewith. This native blockchain platform supports new use cases that create opportunities to share network resources across multiple provider networks, increase workload mobility security, improve billing/mediation and reconciliation and create mechanisms for roaming authentication/registration using blockchain technology. In addition, the native blockchain platform provides new opportunities for the app economy and creates a new market place for Mobile virtual network operators (MVNO) participation.

While there have been shown and described illustrative embodiments of the native blockchain platform, corresponding workload mobility processes, and operations by specific network entities, it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the workload mobility techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for sharing resources in a communication network, the method comprising:
   receiving, by a network slice manager entity, a workload mobility request to add network resources to a domain in the communication network;
   authenticating, by the network slice manager entity, a virtual network function (VNF) with a blockchain authentication function (BAF) entity over a blockchain network interface based on the workload mobility request;
   receiving, by the network slice manager entity, an indication of a successful authentication from the BAF entity; and
   instantiating, by the network slice manager entity, the VNF in the domain of the communication network based on the indication of the successful authentication;
   assigning blockchain credentials to the VNF, wherein the blockchain credentials are associated with the BAF entity; and
   registering the VNF with a core network by sending the blockchain credentials to a Network Repository Function (NRF) entity over the blockchain network interface.

2. The method of claim 1, wherein the domain in the communication network is a first domain, the method further comprising:
   assigning the blockchain credentials to the VNF on initial instantiation;
   receiving, by the network slice manager entity, a second workload mobility request to add additional network resources to a second domain in the communication network;
   identifying, by the network slice manager entity, the VNF instantiated in the first domain for migration to the second domain based on the second workload mobility request;

selecting, by the network slice manager entity, the BAF entity from a plurality of BAF entities based on the blockchain credentials assigned to the VNF;

re-authenticating, by the network slice manager entity, the VNF with the BAF entity over the blockchain network interface; and migrating, by the network slice manager entity, the VNF from the first domain to the second domain based on an indication of a successful authentication.

3. The method of claim 1, wherein the domain in the communication network is a first domain, and wherein the VNF is an existing virtual network function (VNF) associated with a second domain in the communication network, the method comprising:

identifying the existing VNF for migration from the second domain to the first domain based on the workload mobility request; and releasing one or more network resources associated with the VNF in the second domain.

4. The method of claim 1, wherein instantiating the VNF in the domain further comprises:

sending, by the network slice manager entity, configuration parameters associated with the VNF to a network function virtualization orchestrator (NFVO) entity to cause the NFVO entity to build a VNF descriptor file that defines each network resource of the VNF for instantiation.

5. The method of claim 1, wherein authenticating the VNF with the BAF entity further comprises:

comparing a first public key associated with the VNF with a second public key stored by the BAF entity.

6. The method of claim 1, wherein authenticating the VNF with the BAF entity further comprises:

sending a public key associated with the VNF to the BAF entity to register the VNF with the BAF entity.

7. The method of claim 1, wherein authenticating the VNF with the BAF entity further comprises:

exchanging, by the network slice manager entity, messages with the BAF entity through a Security Edge Protection Proxy (SEPP) entity.

8. The method of claim 1, wherein the VNF includes at least one of a network function (NF) associated with a core network of the communication network or a user plane function (UPF) entity associated with user equipment (UE).

9. The method of claim 1, wherein the domain includes at least one of a private cloud domain, a public cloud domain, a trusted domain, an untrusted domain, or a network slice domain.

10. A network slice manager device, comprising:

one or more network interfaces to communicate within a communication network;

a processor coupled to the network interfaces and adapted to execute one or more processes; and a memory configured to store instructions executable by the processor, the instructions when executed operable to:

receive a workload mobility request to add network resources to a domain in the communication network;

authenticate a virtual network function (VNF) with a blockchain authentication function (BAF) entity over a blockchain network interface based on the workload mobility request;

receive an indication of a successful authentication from the BAF entity; and instantiate the VNF in the domain of the communication network based on the indication of the successful authentication:

assign blockchain credentials to the VNF, wherein the blockchain credentials are associated with the BAF entity; and register the VNF with a core network by sending the blockchain credentials to a Network Repository Function (NRF) entity over the blockchain network interface.

11. The network slice manager device of claim 10, wherein the domain in the communication network is a first domain, wherein the instructions, when executed, are further operable to:

assign blockchain credentials to the VNF on initial instantiation;

receive a second workload mobility request to add additional network resources to a second domain in the communication network;

identify the VNF instantiated in the first domain for migration to the second domain based on the second workload mobility request;

select the BAF entity from a plurality of BAF entities based on the blockchain credentials assigned to the VNF;

re-authenticate the VNF with the BAF entity over the blockchain network interface; and migrate the VNF from the first domain to the second domain based on an indication of a successful authentication.

12. The network slice manager device of claim 11, wherein the domain in the communication network is a first domain, and wherein the VNF is an existing virtual network function (VNF) associated with a second domain in the communication network, wherein the instructions, when executed, are further operable to:

identify the existing VNF for migration from the second domain to the first domain based on the workload mobility request; and release one or more network resources associated with the VNF in the second domain.

13. A tangible, non-transitory, computer-readable media having instructions encoded thereon, the instructions, when executed by a processor, are operable to:

receive a workload mobility request to add network resources to a domain in the communication network;

authenticate a virtual network function (VNF) with a blockchain authentication function (BAF) entity over a blockchain network interface based on the workload mobility request;

receive an indication of a successful authentication from the BAF entity; and instantiate the VNF in the domain of the communication network based on the indication of the successful authentication;

assign blockchain credentials to the VNF, wherein the blockchain credentials are associated with the BAF entity; and register the VNF with a core network by sending the blockchain credentials to a Network Repository Function (NRF) entity over the blockchain network interface.

14. The tangible, non-transitory, computer-readable media of claim 13, wherein the domain in the communication network is a first domain, wherein the instructions, when executed, are further operable to:

assign blockchain credentials to the VNF on initial instantiation;

receive a second workload mobility request to add additional network resources to a second domain in the communication network;

identify the VNF instantiated in the first domain for migration to the second domain based on the second workload mobility request;

select the BAF entity from a plurality of BAF entities based on the blockchain credentials assigned to the VNF;

re-authenticate the VNF with the BAF entity over the blockchain network interface; and migrate the VNF from the first domain to the second domain based on an indication of a successful authentication.

15. The tangible, non-transitory, computer-readable media of claim 13, wherein the domain in the communication network is a first domain, and wherein the VNF is an existing virtual network function (VNF) associated with a second domain in the communication network, wherein the instructions, when executed, are further operable to:

identify the existing VNF for migration from the second domain to the first domain based on the workload mobility request; and release one or more network resources associated with the VNF in the second domain.

* * * * *